US007671800B2

(12) United States Patent
Lee

(10) Patent No.: US 7,671,800 B2
(45) Date of Patent: Mar. 2, 2010

(54) BEAMFORMING APPARATUS AND METHOD IN A SMART ANTENNA SYSTEM

(75) Inventor: Jun-Sung Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/634,733

(22) Filed: Dec. 6, 2006

(65) Prior Publication Data

US 2007/0126633 A1 Jun. 7, 2007

(30) Foreign Application Priority Data

Dec. 6, 2005 (KR) ............... 10-2005-0118078

(51) Int. Cl.
*G01S 5/02* (2006.01)
(52) U.S. Cl. .................................. 342/420
(58) Field of Classification Search ................ 342/377, 342/408, 417–429, 379–384, 432; 370/322; 455/562.1; 375/148, 346
See application file for complete search history.

(56) References Cited

U.S. PATENT DOCUMENTS

| 5,371,506 | A  | * | 12/1994 | Yu et al. ..................... 342/380 |
| 6,225,948 | B1 | * | 5/2001  | Baier et al. .................. 342/417 |
| 6,400,780 | B1 | * | 6/2002  | Rashid-Farrokhi et al. .. 375/347 |
| 6,483,459 | B1 | * | 11/2002 | Hou et al. .................... 342/378 |
| 6,718,184 | B1 | * | 4/2004  | Aiken et al. ............. 455/562.1 |
| 6,745,050 | B1 | * | 6/2004  | Forsythe et al. ............. 455/561 |
| 2003/0125091 | A1 | * | 7/2003 | Choi et al. .................. 455/562 |
| 2003/0128160 | A1 | * | 7/2003 | Sim .......................... 342/382 |
| 2003/0151553 | A1 | * | 8/2003 | Ylitalo ....................... 342/422 |
| 2003/0184473 | A1 | * | 10/2003 | Yu ............................. 342/380 |
| 2003/0185285 | A1 | * | 10/2003 | Talwar ....................... 375/148 |
| 2003/0216156 | A1 | * | 11/2003 | Chun ...................... 455/562.1 |
| 2003/0231606 | A1 | * | 12/2003 | Wu et al. .................... 370/334 |
| 2004/0178951 | A1 | * | 9/2004 | Ponsford et al. ............ 342/192 |
| 2005/0062646 | A1 | * | 3/2005 | Sondur ....................... 342/377 |
| 2005/0190105 | A1 | * | 9/2005 | Ishizu et al. ................ 342/383 |
| 2005/0259006 | A1 | * | 11/2005 | Kim et al. ................... 342/377 |
| 2005/0271016 | A1 | * | 12/2005 | Kim et al. ................... 370/332 |
| 2005/0276361 | A1 | * | 12/2005 | Kim et al. ................... 375/347 |
| 2006/0125689 | A1 | * | 6/2006 | Narayan et al. ............. 342/381 |
| 2006/0126753 | A1 | * | 6/2006 | Jwa et al. .................... 375/267 |

FOREIGN PATENT DOCUMENTS

JP 2003-004834 1/2003

\* cited by examiner

*Primary Examiner*—Thomas H Tarcza
*Assistant Examiner*—Nga X Nguyen
(74) *Attorney, Agent, or Firm*—The Farrell Law Firm, LLP

(57) ABSTRACT

A DOA estimating apparatus and method in a smart antenna system using a fixed beamforming scheme are provided. An uplink weight for a received uplink signal is calculated and a projection matrix of an interference signal is generated using the uplink weight. A covariance matrix of the interference signal is generated using the projection matrix of the interference signal, and power of the received signal and power of the interference signal are calculated using the covariance matrix of the interference signal and a covariance matrix of the received signal. A DOA is estimated based on the difference between the received signal power and the interference power.

23 Claims, 8 Drawing Sheets

BEAMFORMING APPARATUS AND METHOD IN A SMART ANTENNA SYSTEM

PRIORITY

This application claims priority under 35 U.S.C. § 119 to an application entitled "Beamforming Apparatus And Method In A Smart Antenna System" filed in the Korean Intellectual Property Office on Dec. 6, 2005 and assigned Serial No. 2005-118078, the contents of which are incorporated herein by reference.

BACKGROUND OF THE INVENTION

1. Field of the Invention

The present invention relates generally to a beamforming apparatus and a method in a smart antenna system, and in particular, to an apparatus and method for performing fixed beamforming by estimating a Direction Of Arrival (DOA) with a maximum Signal-to-Interference and Noise Ratio (SINR) in a smart antenna system.

2. Description of the Related Art

The performance and capacity of a mobile communication system are limited due to the features of radio channels such as co-channel interference, path loss, multipath fading, signal delay, Doppler spread, and shadowing. Hence, a mobile communication system mitigates the performance and capacity limitations through power control, channel coding, rake reception, antenna diversity, sectorization, frequency division, and spectrum spread.

With the advent of the wireless multimedia era, the demands for high-speed transmission of a large volume of data on a radio channel are rapidly increasing. The development of mobile communication technology has brought about a hybrid cell environment with different service signals. Under the hybrid cell environment, a transmitted signal is strongly interfered with by other signals with a relatively great transmit power and a relatively wide bandwidth. As a solution to performance degradation caused by the interference and the channel characteristics, a smart antenna system has attracted much attention.

FIG. 1 illustrates beam patterns in a general smart antenna system. Referring to FIG. 1, in the smart antenna system, a Base Station (BS) 100 forms a beam pattern 111 for a pilot signal such that it covers an entire cell service area 113. Also, the BS 100 estimates a channel for a Mobile Station (MS) 102 and beamforms a traffic signal for the MS 102 in a beam pattern 115 according to the channel estimation. Since beams are narrowed in the beam pattern 115, transmit power is reduced.

Accordingly, the smart antenna system can increase the SINR of a transmitted signal by directing a beam in the direction of an intended MS. Adaptive beamforming and fixed beamforming are two beamforming schemes are considered for the smart antenna system. In adaptive beamforming, a beam coefficient is generated adaptively according to the channel status of the MS and beamforming is performed with the beam coefficient, whereas in the fixed beamforming, a fixed antenna beamforming coefficient is used for beamforming.

As illustrated in FIG. 2, a predetermined fixed antenna beamforming coefficient is used for beamforming in the fixed beamforming scheme.

A spatial beam is selected which maximizes SINR, taking into account the fixed beam coefficient, the location of the MS, and spatial signal characteristics. Also, the DOA of the MS is estimated and the beam is steered in the DOA. As illustrated in FIG. 2, the beam is steered in an optimum direction using a predetermined beam coefficient.

For accurate DOA estimation, Multiple SIgnal Classification (MUSIC) and Estimation of Signal Parameter via Rotational Invariance Technique (ESPRIT) are generally used. However, these DOA estimation methods are not effective in accurately estimating the DOA of a main signal in case of multiple paths. In addition, computational complexity increases with the number of antennas, which makes it difficult to implement the conventional DOA estimation methods in typical communication systems.

Depending on the environment of a communication system adopting the fixed beamforming scheme, antenna paths differ in cable length. As a result, predetermined beamforming coefficients are useless.

SUMMARY OF THE INVENTION

An object of the present invention is to substantially solve at least the above problems and/or disadvantages and to provide at least the advantages described below. Accordingly, an object of the present invention is to provide an apparatus and method for performing beamforming by accurate DOA estimation in a smart antenna system.

Another object of the present invention is to provide an apparatus and method for performing beamforming by estimating a DOA with a maximum SINR in a smart antenna system using a fixed beamforming scheme.

The above objects are achieved by providing a DOA estimating apparatus and method in a smart antenna system using a fixed beamforming scheme.

According to an aspect of the present invention, there is provided in a DOA estimating method for a multi-antenna system, an uplink weight for a received uplink signal is calculated and a projection matrix of an interference signal is generated using the uplink weight. A covariance matrix of the interference signal is generated using the projection matrix of the interference signal, and power of the received signal and power of the interference signal are calculated using the covariance matrix of the interference signal and a covariance matrix of the received signal. A DOA is estimated based on the difference between the received signal power and the interference power.

According to another aspect of the present invention, in a DOA estimating apparatus for a multi-antenna system, a phase weight generator generates phase weights for individual antennas. A covariance matrix generator generates a covariance matrix of uplink signals received at the antennas. A DOA estimator calculates power of the received signals and power of an interference signal using the phase weights and the covariance matrix of the received signals and estimates a DOA based on the power.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for performing beamforming by estimating a DOA that maximizes SINR in a smart antenna system using a fixed beamforming scheme. While the following description is made in the context of an Orthogonal Frequency Division Multiple Access (OFDMA) wireless communication system, by way of example, it is to be clearly understood that the present invention is applicable to other multiple access schemes.

Figure 1:
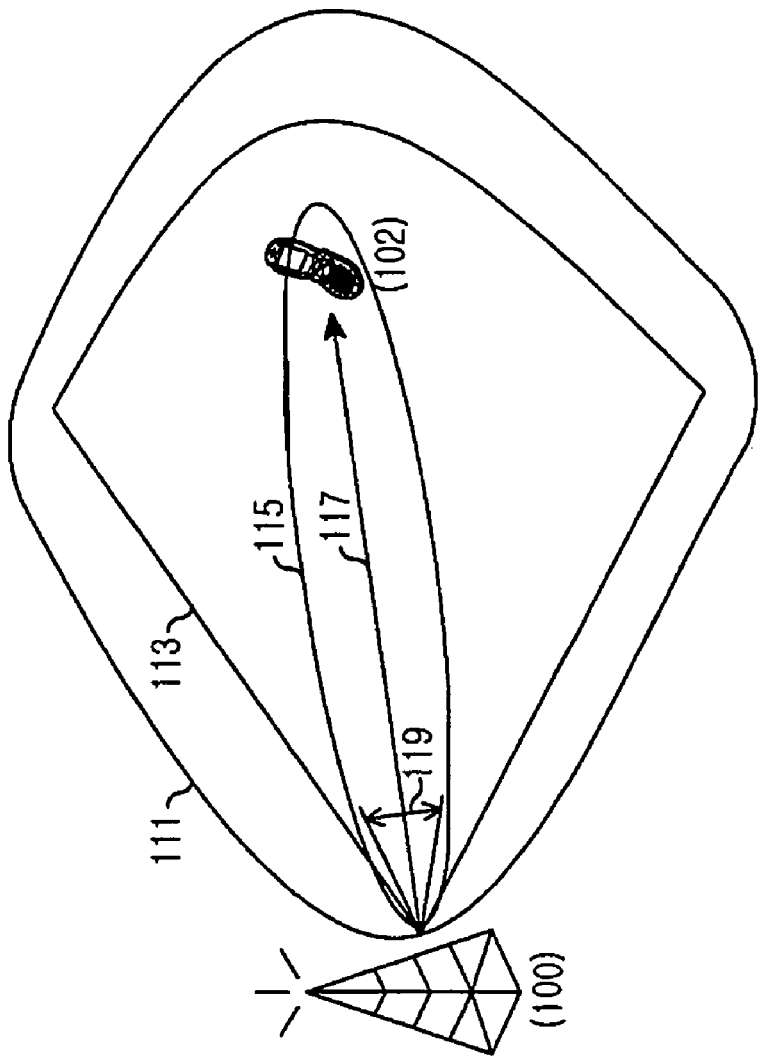
FIG. 1 illustrates beam patterns in a general smart antenna system.
Figure 2:
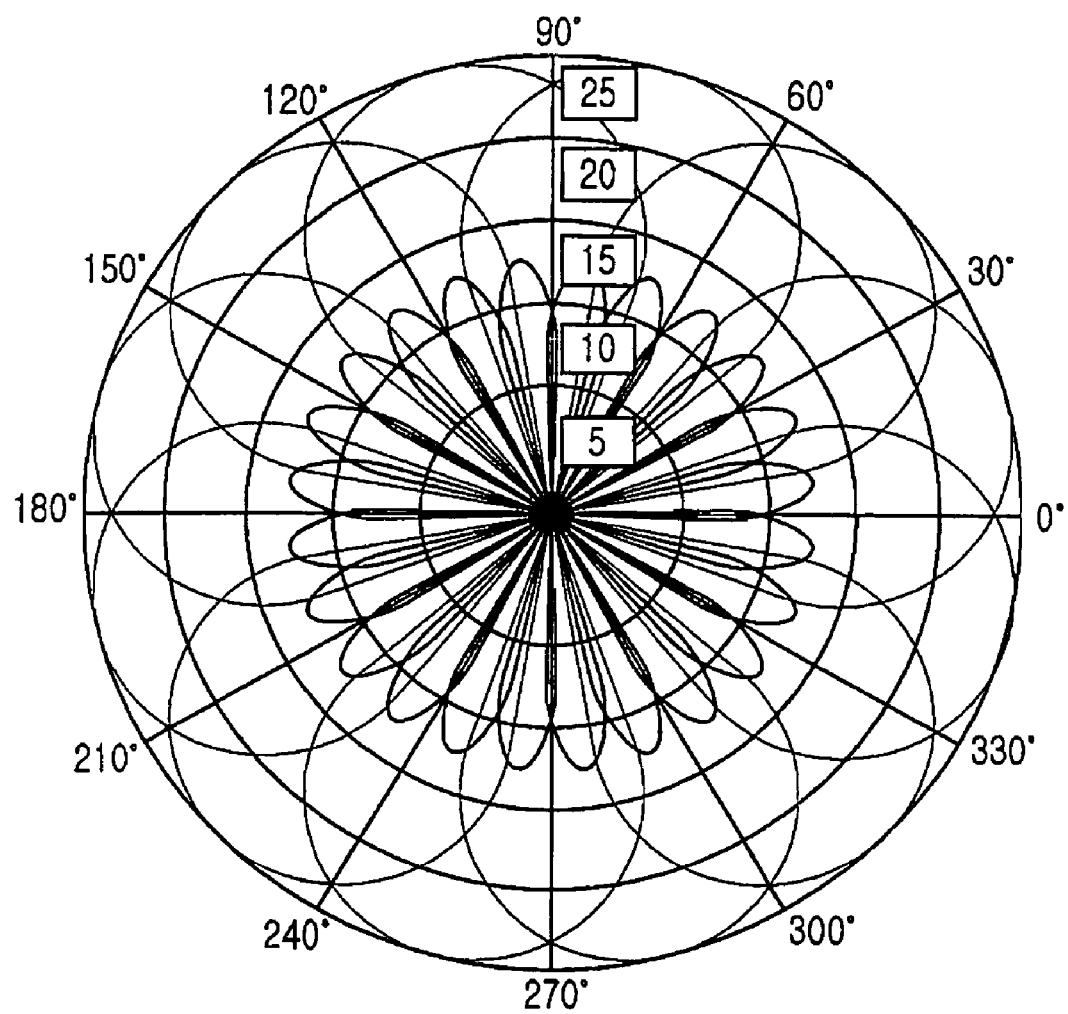
FIG. 2 illustrates beam patterns according to a fixed beamforming scheme in a conventional smart antenna system.
Figure 3:
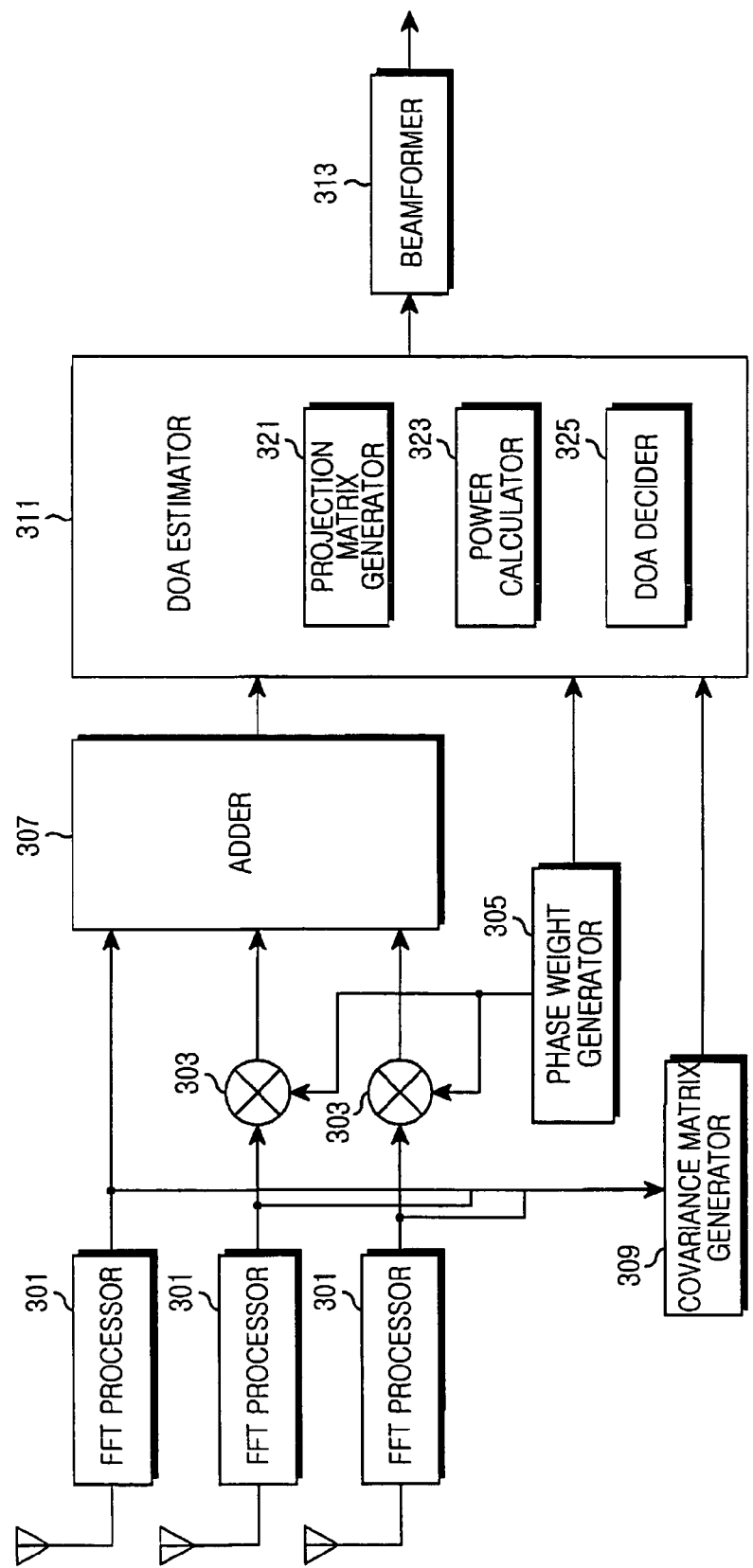
FIG. 3 is a block diagram illustrating a Base Station (BS) in a smart antenna system according to the present invention.

FIG. 3 is a block diagram illustrating a BS in a smart antenna system according to the present invention.

Referring to FIG. 3, the BS includes Fast Fourier Transform (FFT) processors 301, multipliers 303, a phase weight generator 305, an adder 307, a covariance matrix generator 309, a DOA estimator 311, and a beamformer 313.

The FFT processors 301 convert time signals received through antennas to frequency signals by FFT.

The multipliers 303 compensate the phases of the received signals by multiplying the frequency signals by phase weights a(θ) calculated for corresponding antennas by the phase weight generator 305, thereby creating beams of uplink signals.

The phase weight generator 305 generates the phase weights for forming the beams of the signals received through the respective antennas based on a DOA estimated by the DOA estimator 311.

The adder 307 sums the phase-compensated signals received from the multipliers 303. The covariance matrix 309 generates a covariance matrix using the covariance vectors of the signals received through the antennas.

The DOA estimator 311 includes a projection matrix generator 321, a power calculator 323, and a DOA decider 325.

The projection matrix generator 321 estimates the channel of the signal received from the adder 307 and calculates an uplink weight $W_{UP}$ based on an uplink signal with a maximum SINR. Then the projection matrix generator 321 creates a projection matrix representing interference in the received signal using the uplink weight $W_{UP}$ by Equation (1) below $$C = I - W_{UP}(W^H_{UP}W_{UP})^{-1}W^H_{UP}, \quad (1)$$

where C denotes the projection matrix of the interference signal, $W_{UP}$ denotes the uplink weight, and I is an identity vector.

The power calculator 323 calculates the power of the received signal, $P_{con}$ and the power of the interference signal, $P_{mod}$, according to Equation (2) below, using the phase weight received from the phase weight generator 305, the covariance matrix received from the covariance matrix generator 307, and the projection matrix received from the projection matrix generator 321. Notably, the phase weight is based on the DOA of a previous frame.

$$P_{con} = \frac{a^H(\theta)Ra(\theta)}{a^H(\theta)a(\theta)}, \quad (2)$$

$$P_{mod} = \frac{a^H(\theta)R_{mod}a(\theta)}{a^H(\theta)a(\theta)}$$

where R denotes the covariance matrix of the received signal, a(θ) denotes the phase weights for the respective antennas, and $R_{mod}$, set forth in Equation (3) below, denotes the covariance matrix of the interference signal.

$$R_{mod} = \beta(C \times R \times C) \quad (3)$$

where β denotes a normalization vector, C denotes the projection matrix representing the interference signal, created by Equation (1), and R denotes the covariance matrix of the received signal.

The DOA decider 325 selects an angle, as expressed by Equation (4) below, that maximizes the difference between the received signal power $P_{con}$ and the interference power $P_{mod}$ as a DOA.

$$\hat{\theta} = \underset{\theta_i}{\mathrm{argmax}} P_{con}(\theta_i) - P_{mod}(\theta_i), \quad (4)$$

where $P_{con}(\theta)$ denotes the received signal power and $P_{mod}(\theta)$ denotes the interference power.

The beamformer 313 forms a beam according to a direction that the DOA estimator 311 provides.

Figure 4:
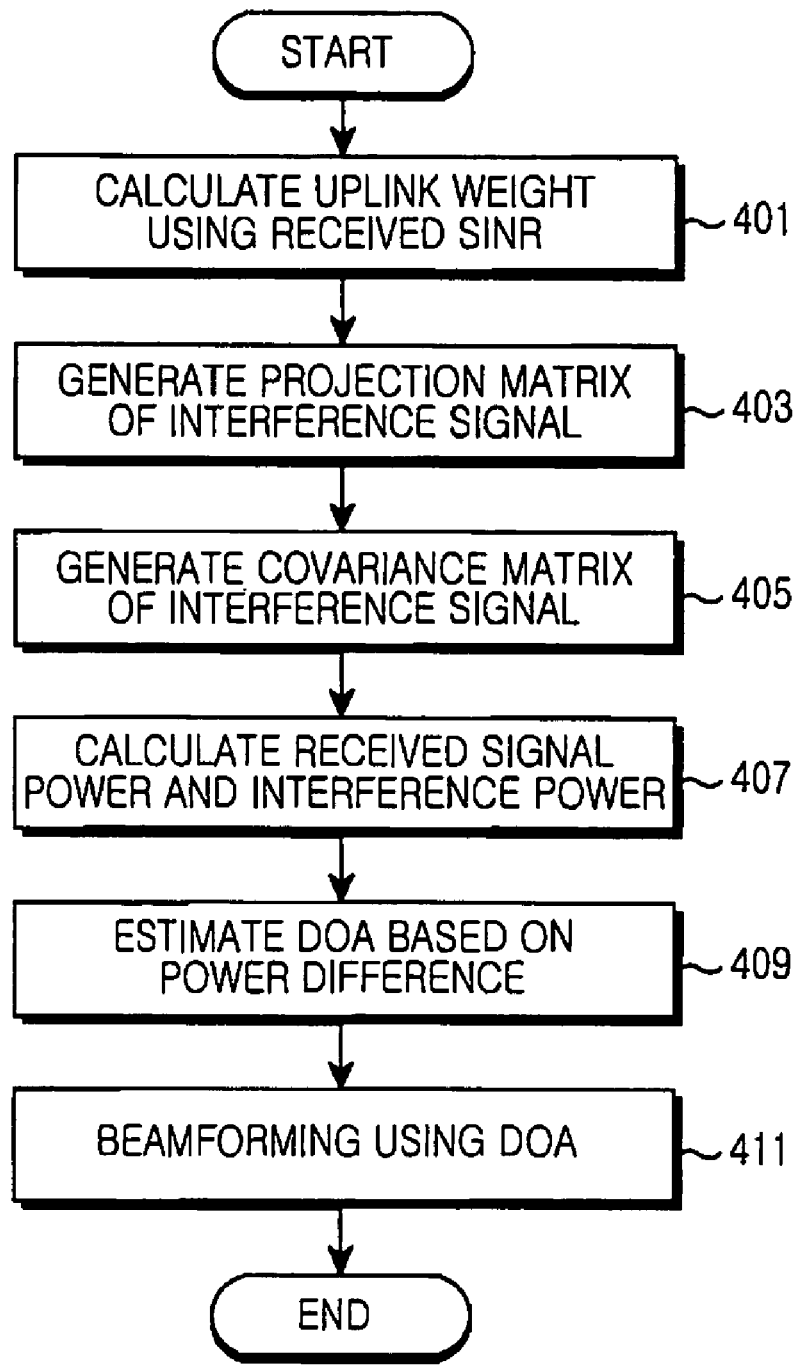
FIG. 4 is a flowchart illustrating a Direction Of Arrival (DOA) estimation procedure in the smart antenna system according to the present invention.

FIG. 4 is a flowchart illustrating a DOA estimation procedure in the BS in the smart antenna system according to the present invention.

Referring to FIG. 4, the BS estimates the channels of uplink signals received from an MS and calculates an uplink weight $W_{UP}$ based on an uplink signal with a maximum SINR in step 401.

In step 403, the BS generates the projection matrix of an interference signal by calculating Equation (1) using the uplink weight $W_{UP}$.

In step 405, the BS generates the covariance matrix of the interference signal, $R_{mod}$ by calculating Equation (3) using the projection matrix in order to estimate a DOA. Then, in step 407, the BS calculates the power of the received signal, $P_{con}$ and the power of the interference signal, $P_{mod}$ by use of Equation (2).

In step 409, the BS determines the DOA based on the difference between the received signal power $P_{con}$ and the interference signal power $P_{mod}$ by use of Equation (4). The DOA is an angle that maximizes the difference between $P_{con}$ and $P_{mod}$.

The BS performs beamforming using the estimated DOA in step 411 and ends the process of the present invention.

Herein a description will be made of the performance of the present invention when a DOA with a maximum SINR is estimated and beamforming is carried out based on the estimated DOA in the smart antenna system. It is assumed herein that the BS has four antennas and the MS moves at 60 km/h in order to evaluate the performance of the smart antenna system. Also, three paths at angles of 5°, 10°, and 30° are assumed.

Figure 5:
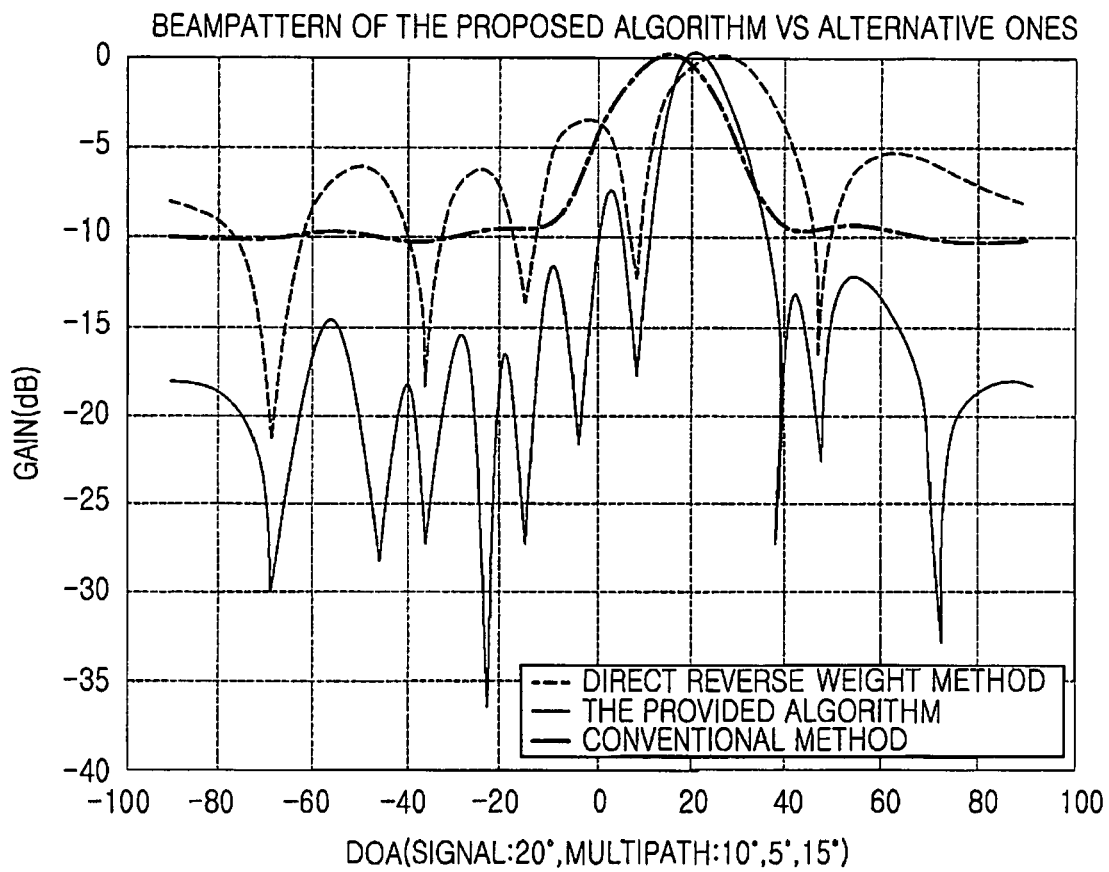
FIG. 5 is a graph illustrating a beam pattern in the smart antenna system according to the present invention.

FIG. 5 is a graph illustrating a beam pattern in the smart antenna system according to the present invention. The horizontal axis represents DOA and the vertical axis represents gain.

Referring to FIG. 5, the present invention estimates an angle with a maximum difference between received signal power and interference power as a DOA and performs beamforming according to the DOA. Therefore, a less error is created with respect to the DOA (20°) of the original signal in the present invention, compared to beamforming based on a DOA estimated by conventional DOA estimation methods such as MUSIC and ESPRIT.

Figure 6:
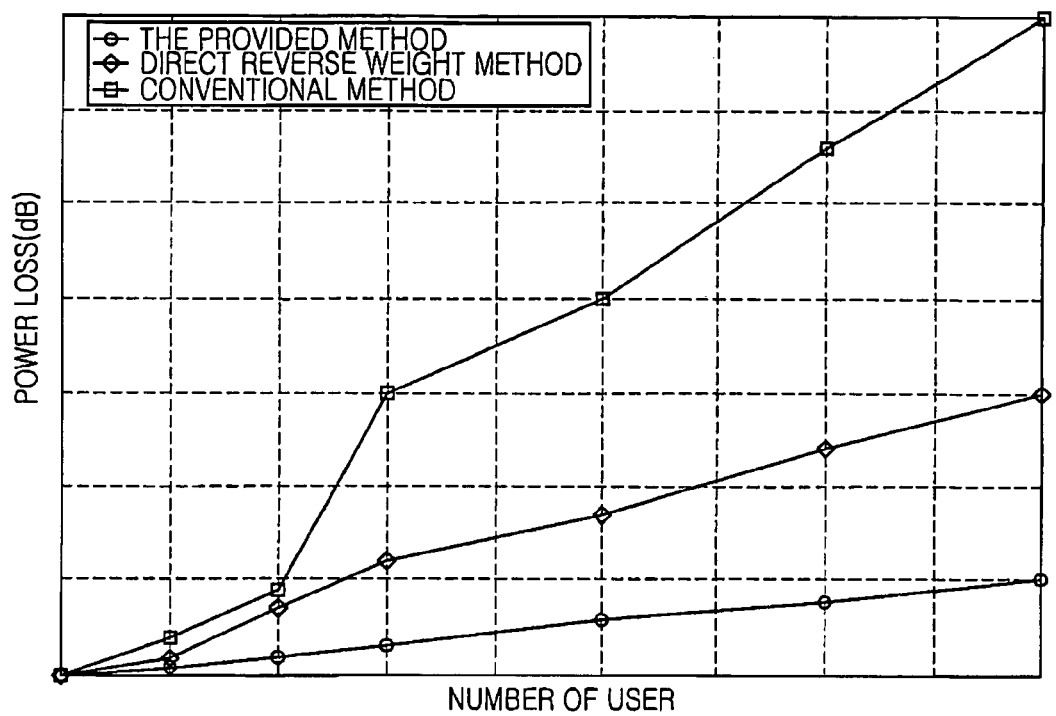
FIG. 6 is a graph illustrating power loss in the smart antenna system according to the present invention.

FIG. 6 is a graph illustrating power loss in the smart antenna system according to the present invention. The horizontal axis represents the number of users and the vertical axis represents power loss rate.

Referring to FIG. 6, the DOA estimation of the present invention for beamforming leads to a less DOA error as illustrated in FIG. 5. Consequently, it follows that beamforming error-incurred power loss is reduced.

Figure 7:
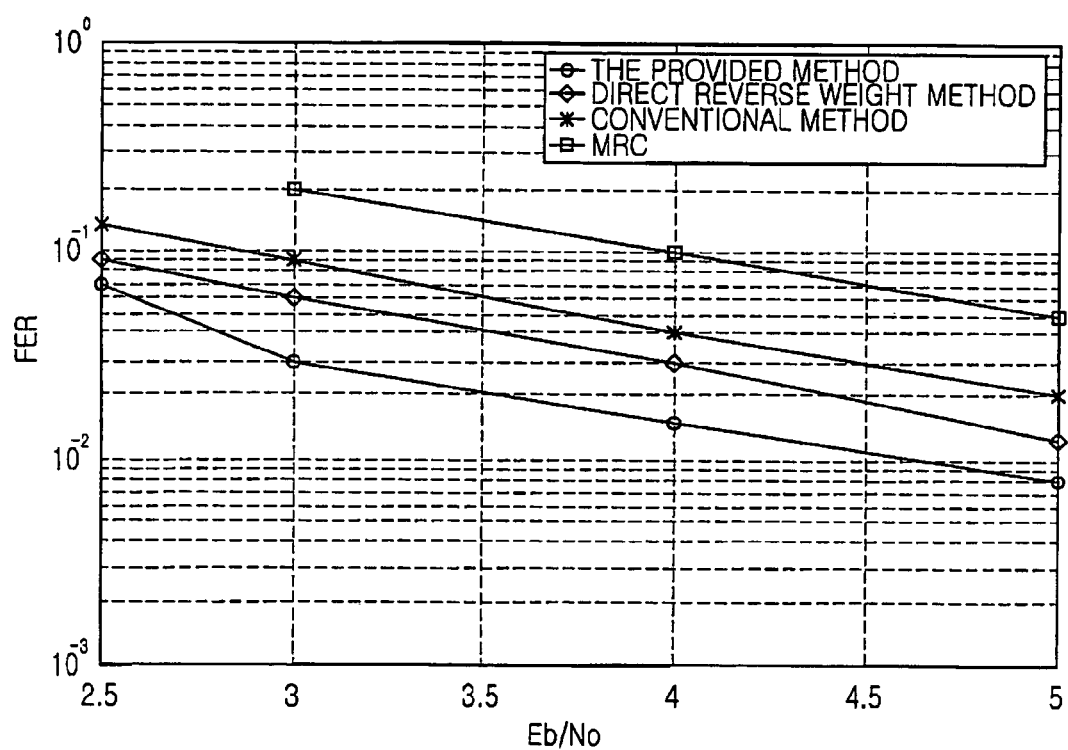
FIG. 7 is a graph illustrating Signal-to-Interference and Noise Ratio (SINR) versus Frame Error Rate (FER) in the smart antenna system according to the present invention.

FIG. 7 is a graph illustrating SINR versus FER (Frame Error Rate) in the smart antenna system according to the present invention. The horizontal axis represents SINR and the vertical axis represents FER.

Referring to FIG. 7, the DOA estimation of the present invention reduces FER with respect to SINR because of the DOA error decrease.

Figure 8:
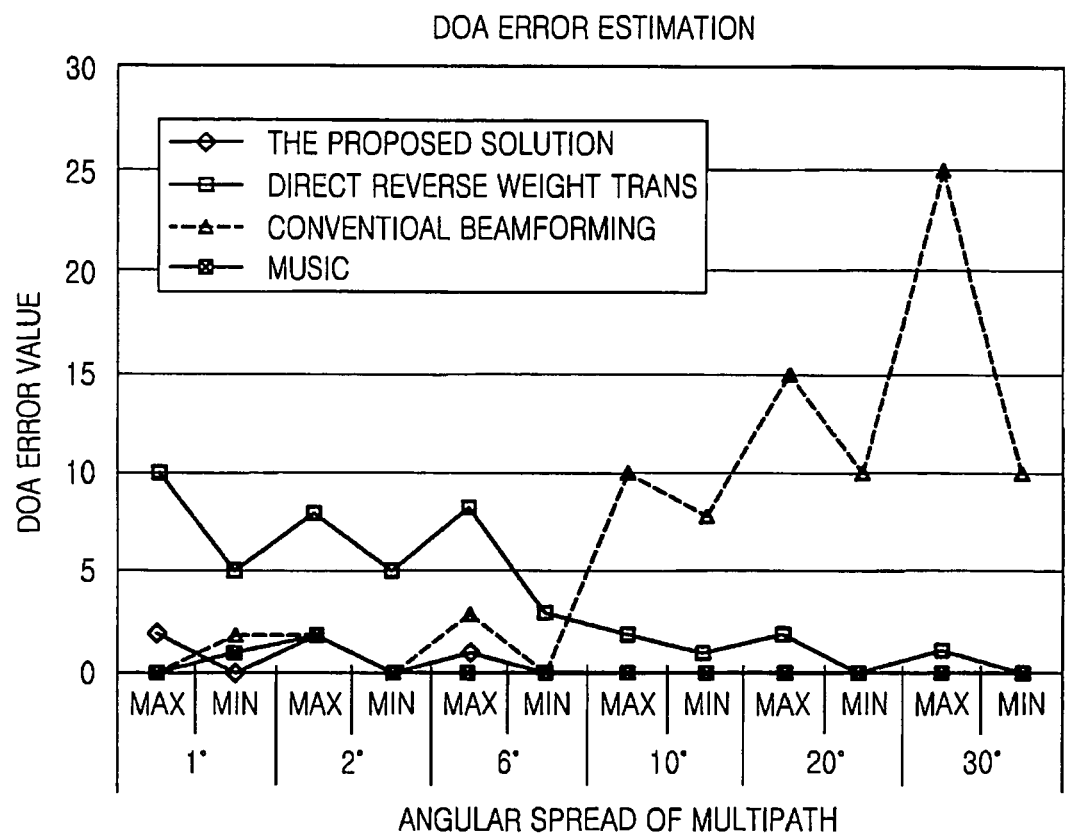
FIG. 8 is a graph illustrating DOA errors in the smart antenna system according to the present invention.

FIG. 8 is a graph illustrating DOA errors in the smart antenna system according to the present invention. The horizontal axis represents multipath angular spread and the vertical axis represents DOA error rate.

Referring to FIG. 8, as illustrated in FIG. 5, the estimation of a DOA with a maximum SINR in the present invention decreases DOA errors. Therefore, DOA errors estimated with respect to multipath angular spread are also decreased.

In accordance with the present invention as described above, a DOA that maximizes SINR is estimated and beamforming is performed in the estimated DOA in a smart antenna system using a fixed beamforming scheme. Therefore, power loss caused by beamforming errors is reduced and the DOA estimation is carried out with a small amount of computation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of estimating a Direction Of Arrival (DOA) for beamforming in a multi-antenna system, comprising the steps of:
    calculating an uplink weight for a received uplink signal and generating a projection matrix of an interference signal using the uplink weight;
    generating a covariance matrix of the interference signal using the projection matrix of the interference signal;
    calculating power of the received signal and power of the interference signal using the covariance matrix of the interference signal and a covariance matrix of the received signal; and
    estimating a DOA based on the difference between the received signal power and the interference power.

2. The method of claim 1, wherein generating a covariance matrix of the interference signal comprises generating the covariance matrix of the interference signal using the projection matrix of the interference signal and the covariance matrix of the received signal.

3. The method of claim 1, wherein the covariance matrix of the interference signal by $$R_{mod} = \beta(C \times R \times C),$$

where $\beta$ denotes a normalization vector, C denotes the projection matrix of the interference signal, and R denotes the covariance matrix of the received signal.

4. The method of claim 1, wherein the step of calculating power of the received signal and power of the interference signal comprises calculating the power of the interference signal by $$P_{mod} = \frac{a^H(\theta) R_{mod} a(\theta)}{a^H(\theta) a(\theta)},$$

where $a(\theta)$ denotes phase weights for antennas and $R_{mod}$ denotes the covariance matrix of the interference signal.

5. The method of claim 1, wherein the DOA estimating step comprises:
    calculating the difference between the received signal power and the interference power; and
    selecting an angle that maximizes the difference between the received signal power and the interference power as the DOA.

6. The method of claim 1, wherein the DOA estimating step comprises estimating the DOA by $$\hat{\theta} = \underset{\theta_i}{\mathrm{argmax}} P_{con}(\theta_i) - P_{mod}(\theta_i),$$

where $P_{con}(\theta)$ denotes the received signal power and $P_{mod}(\theta)$ denotes the interference power.

7. The method of claim 1, wherein the DOA has a maximum Signal-to-Interference and Noise Ratio (SINR).

8. The method of claim 1, further comprising beamforming a downlink signal using the DOA.

9. The method of claim 1, further comprising
    calculating phase weights for respective antennas using the DOA; and
    beamforming uplink signals received at the antennas using the phase weights.

10. An apparatus for estimating a Direction Of Arrival (DOA) for beamforming in a multi-antenna system, comprising:
    a phase weight generator for generating phase weights for individual antennas;
    a covariance matrix generator for generating a covariance matrix of uplink signals received at the antennas;
    a DOA estimator for calculating power of the received signals and power of an interference signal using the phase weights and the covariance matrix of the received signals, and estimating a DOA based on the power; and
    a projection matrix generator for generating a projection matrix of the interference signal.

11. The apparatus of claim 10, wherein the DOA estimator comprises:
    a power calculator for calculating the received signal power and the interference power using the phase weights, the covariance matrix of the received signal, and the projection matrix of the interference signal; and a DOA decider for estimating the DOA by comparing the received signal power with the interference power.

12. The apparatus of claim 11, wherein the projection matrix generator calculates an uplink weight by estimating the channels of the uplink signals, and generates the projection matrix of the interference signal using the uplink weight.

13. The apparatus of claim 12, wherein the projection matrix generator generates the projection matrix of the interference signal by $$C = I - W_{UP}(W^H_{UP}W_{UP})^{-1}W^H_{UP},$$

where C denotes the projection matrix of the interference signal, $W_{UP}$ denotes the uplink weight, and I is an identity vector.

14. The apparatus of claim 11, wherein the power calculator calculates the received signal power using the phase weights and the covariance matrix of the received signals, and calculates the interference power using the phase weights, a covariance matrix of the interference signal, and the projection matrix of the interference signal.

15. The apparatus of claim 14, wherein the power calculator calculates the covariance matrix of the interference signal using the covariance matrix of the received signal, the projection matrix of the interference signal, and the phase weights of the antennas.

16. The apparatus of claim 14, wherein the power calculator generates the covariance matrix of the interference signal by $$R_{mod} = \beta(C \times R \times C),$$

where β denotes a normalization vector, C denotes the projection matrix of the interference signal, and R denotes the covariance matrix of the received signal.

17. The apparatus of claim 14, wherein the power calculator calculates the power of the interference signal by $$P_{con} = \frac{a^H(\theta)Ra(\theta)}{a^H(\theta)a(\theta)},$$

$$P_{mod} = \frac{a^H(\theta)R_{mod}a(\theta)}{a^H(\theta)a(\theta)},$$

where $P_{con}$ denotes the received signal power, $P_{mod}$ denotes the interference power, R denotes the covariance matrix of the received signal, $a(\theta)$ denotes the phase weights of the antennas, and $R_{mod}$ denotes the covariance matrix of the interference signal.

18. The apparatus of claim 11, wherein the DOA decider selects an angle that maximizes the difference between the received signal power and the interference power as the DOA.

19. The apparatus of claim 11, wherein the DOA decider determines the DOA by $$\hat{\theta} = \underset{\theta_i}{\mathrm{argmax}} P_{con}(\theta_i) - P_{mod}(\theta_i),$$

where $P_{con}(\theta)$ denotes the received signal power and $P_{mod}(\theta)$ denotes the interference power.

20. The apparatus of claim 10, further comprising a beamformer for beamforming a downlink signal using the DOA.

21. The apparatus of claim 10, wherein the phase weight generator calculates phase weights for respective antennas using the DOA.

22. The apparatus of claim 10, further comprising a multiplier for beamforming the uplink signals by multiplying the uplink signals received at the antennas by the phase weights.

23. An apparatus for estimating a Direction Of Arrival (DOA) for beamforming in a multi-antenna system, comprising:

means for calculating an uplink weight for a received uplink signal and generating a projection matrix of an interference signal using the uplink weight;

means for generating a covariance matrix of the interference signal using the projection matrix of the interference signal;

means for calculating power of the received signal and power of the interference signal using the covariance matrix of the interference signal and a covariance matrix of the received signal; and means for estimating a DOA based on the difference between the received signal power and the interference power.

* * * * *